Dec. 23, 1924.
E. D. McCULLOUGH ET AL
1,520,296
WAGON AND TRUCK DUMP
Filed June 9, 1922
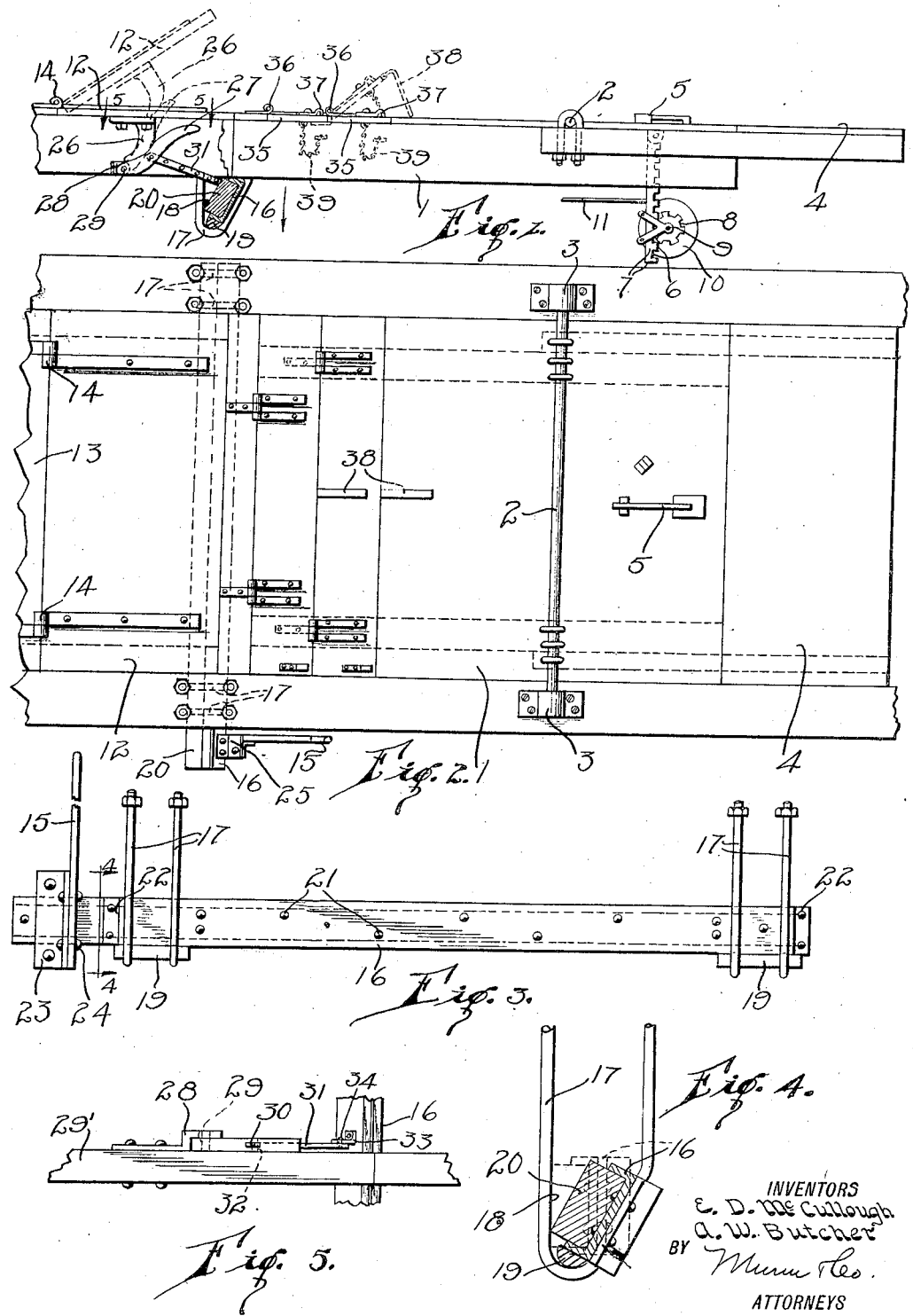

Patented Dec. 23, 1924.

1,520,296

UNITED STATES PATENT OFFICE.

ELI D. McCULLOUGH AND ARCHIE W. BUTCHER, OF SOLOMON, KANSAS, ASSIGNORS, BY DIRECT AND MESNE ASSIGNMENTS, TO THE GRAVITY DUMP MANUFACTURING COMPANY, A CORPORATION OF KANSAS.

WAGON AND TRUCK DUMP.

Application filed June 9, 1922. Serial No. 567,158.

*To all whom it may concern:*

Be it known that we, ELI D. MCCULLOUGH and ARCHIE W. BUTCHER, citizens of the United States, and residents of Solomon, in the county of Dickinson and State of Kansas, have invented a new and useful Improvement in Wagon and Truck Dumps, of which the following is a full, clear, and exact description.

Our invention relates to improvements in wagon and truck dumps, and it consists in the combinations, constructions and arrangements herein described and claimed:

An object of our invention is to provide an improvement over that form of the device shown in our prior application for patent on wagon and truck dump, Serial No. 527,957, filed Jan. 9, 1922. In said application there was disclosed a dump which had an extension that could be readily attached or detached from the dump at will, whereby the dump could be used for a truck or for a wagon. The construction of the present device is primarily designed to provide a positive means for locking the dump against operation until the grain bin door is opened.

A further object of our invention is to provide a truck and wagon dump in which portions of the floor are adapted to be used as stops for the wagon or truck to be dumped.

A further object of our invention is to provide a truck and wagon dump in which the grain door has to be opened before the dump trip can be operated, and in which the door cannot be closed until the dump trip is supporting the dump and in an inoperative position.

A further object of our invention is to provide a truck and wagon dump, which has positive means for holding the dump in a level position with the floor, and which has means for releasing the the dump so as to empty the contents of a wagon or truck.

A further object of our invention is to provide a truck and wagon dump which is strong and durable for the purpose intended and which is not likely to easily get out of order.

Other objects and advantages will appear in the following specification, and the novel features of the invention will be particularly pointed out in the appended claims.

Our invention is illustrated in the accompanying drawings, forming part of this application, in which—

Fig. 1 is a side elevation of the device, portions thereof being broken away,

Fig. 2 is a plan view of the device,

Fig. 3 is a side elevation of a portion of the device,

Fig. 4 is a section along the line 4—4 of Fig. 3, and

Fig. 5 is a section along the line 5—5 of Fig. 1.

In carrying out our invention, we make use of a wagon and truck dump disclosed in our prior applications, Serial Numbers 527,957 and 547,190. In the application, Serial No. 527,957 a wagon dump was provided with an extension which permitted the device to be used for dumping a truck or wagon. In the application, Serial No. 547,190 a novel braking mechanism was employed with a dump, whereby the movement of the dump could be controlled at will.

In Fig. 1 we have shown the dump indicated at 1 as being pivotally mounted on a transverse rod 2, the rod being journalled in bearings 3, (see Fig. 2). A dump extension 4 is also pivotally secured to the rod 2 and can be locked in engagement with the dump 1 by means of a key 5. This construction has been fully described in our former application, Serial No. 527,957 and therefore requires no further description. Our present device also makes use of the brake mechanism indicated generally at 6. This mechanism comprises a rack 7, which is pivotally secured to the dump 1 and which is held in engagement with gear 8. The gear 8 is mounted on a shaft 9, the shaft carrying a brake drum 10 at one end thereof. A cable 11 operatively connects the brake drum 10 with a lever (not shown). The dump 1 is adapted to swing in the direction of the arrow, due to gravity, and is controlled in its movement by the brake drum 10. This special construction has been clearly described in our application for patent, Serial No. 547,190, filed March 27, 1922 and therefore needs no further description.

A channel iron 16 is disposed adjacent to the end of the dump 1 and is provided with means for holding and releasing the dump.

This means is clearly shown in Figures 3 and 4 and comprises a channel iron 16, which extends transversely across the dump 1 and which is carried by U-bolts 17. In Fig. 2, we have shown the U-bolts 17 as being secured to the platform 13. The bolts 17 are disposed adjacent to the dump 1 and pivotally support the channel iron 16. As clearly shown in Fig. 4, the bolts 17 have a V-shaped trough in the bottom thereof, one side of this trough being vertical, as at 18. The bolts are therefore adapted to support the channel iron 16 in two positions. Bearing members 19 are secured to the channel iron 16 so as to slidably engage with the bolt 17 (see Figures 3 and 4). The channel iron is reenforced by a wood beam 20, the beam being secured to the channel iron by bolts 21. The channel iron is prevented from lateral movement by angle irons 22 which are secured to the channel irons 16 and which bear against the bolts 17 (see Fig. 3). In this construction, it will be observed that the channel iron 16 may be rocked from the full line position shown in Fig. 4 into the dotted line position and at the same time be prevented from lateral movement with respect to the bolt 17.

The channel iron 16 is controlled in its movement by the lever 15. The lever 15 is secured to an angle iron 23 by bolts 24, the angle iron 23, in turn, being secured to the channel iron 16 by brackets 25. In this manner, the channel iron 16 may be rocked by merely swinging the lever 15. As clearly shown in Fig. 1, the channel iron, when swung away from the side 18 of the bolts 17, is disposed beneath one end of the dump 1, whereby the dump is secured against movement. When the lever 15 is swung so as to dispose the channel iron 16 in a vertical position, the channel iron is moved out of engagement with the dump and permits the free movement of the dump. This construction provides a simple means by which the dump is secured or released when desired.

A grain bin door 12 is disposed adjacent to the end of the dump 1 and is pivotally secured to the platform 13 by means of hinges 14. The door 12 is operatively connected to the channel iron 16 so that when the door 12 is swung through an arc of 180°, the channel iron 16 is permitted to swing to vertical position, thereby releasing the dump 1. In Figures 1 and 5, we have shown the means which operatively connects the door 12 to the channel iron 16. A cam member 26 is rigidly secured to the under side of the door 12 and is adapted to operatively engage with the pivoted cam member 27. As clearly shown in Fig. 5, the cam member 27 is pivotally secured to a bracket 28 at 29, the bracket being rigidly secured to one of the girders of the platform 13. The cam 27 has a slot 30 therethrough in which is disposed one end of a link 31. The link 31 is pivotally connected to a bracket 33 by a pin 34. The bracket 33 is secured to the angle iron 16 and is adapted to be moved when the channel iron is rotated. It will be observed that the lever 15 cannot be swung when the door 12 is closed, since the cam 26 prevents the cam 27 from movement. The contact surface of the cams 27 and 26 are fashioned so as to permit no movement therebetween when the door 12 is closed. (See Fig. 1.) This construction provides a simple means by which the dump is always locked until the grain door is opened, thereby preventing premature dumping and absolute safety to the truck or wagon being dumped.

The platform of the dump 1 has two hinged portions 35 which are adapted to be raised so as to provide stops for the truck or wagon to be dumped. The portions 35 are hinged at 36 and carry eyes 37, by means of which they are swung into open position. A hook (not shown) may be disposed in either one of the eyes 37 and by manually raising the hook, the portion 35 is swung upwardly. A hinged pin 38 is secured to the free end of each of the portions 35 and is adapted to swing into engagement with the floor of the dump when the portion 35 is swung upwardly. In Fig. 1, we have shown one of the portions 35 in raised position and have shown the pin 38 as engaging with the floor of the dump and holding the portion 35 in raised position. The portion 35 disposed adjacent to the end of the dump is adapted to be used as a stop when the device dumps a wagon, and the next portion 35 is used as a stop when the device dumps a truck. It will be seen from this construction that the portions 35 act as a part of the dump platform when the device is in inoperative position and act as stops when the device is dumping a wagon or a truck. In this manner, we provide a simple means which performs a two-fold function.

From the foregoing description of the various parts of the device, the operation thereof may be readily understood. When dumping a wagon, the extension 4 is not used and the portion 35 which is disposed adjacent to the end of the dump, is used as a stop for the wagon. When dumping a truck the extension 4 is used and the other portion 35 is used for a stop. When the door 12 is swung into open position so as to lie flat on the floor 13, the cam 27 will be released, thereby permitting the lever 15 controlling the channel iron 16 to rotate and release the dump 1. The dump 1 will now drop, due to gravity, and will swing in the direction of the arrow shown in Fig. 1. The descent of the dump can be controlled by swinging the lever (not shown) which is operatively connected to the drum 10. The truck or wagon can also be held in its lowered position by means of the drum 10 until the wagon or truck has been entirely emptied of its contents. The brake drum 10 may now be released so as to permit the dump to return to its normal position, whereupon the lever 15 may be swung so as to dispose the channel iron 16 under the dump 1, and the door 12 may be manually closed. The cams 26 and 27 will now be locked so as not to permit premature dumping of the device.

The operation in dumping of a truck is identical to the operation in dumping a wagon, except that in dumping a truck, the extension 4 is used and the inner portion 35 is swung into operative position so as to provide a stop for the truck. The dump 1 may now be released in the manner heretofore described and the movement of the dump controlled by the brake drum 10, whereupon the contents of the truck will be conveyed through the door 12 and into the grain bin (not shown). The device is efficient for the purpose intended and provides a simple and durable means by which the contents of a truck or wagon is dumped.

The portions or stops 35 are provided with chains 39 which determine the movement of the portions. It will also be noted that the link 31 has a plurality of openings therein which permits the cam 27 to be adjusted with respect thereto. In this manner the channel iron is securely locked against movement by the cam 26. The device provides a simple means by which the dump releasing lever 15 cannot be actuated until the door 12 is opened. The channel iron 16 also provides a positive safety lock. It should further be noted that the door 12 cannot be closed until the dump is in closed position and the bar 16 disposed therebeneath.

We claim:

1. In a device of the type described, a frame, a dump, a door carried by said frame and disposed adjacent to one end of said dump, a transversely extending bar adapted to be swung beneath said dump or said door, a stationary cam member carried by said door, a pivoted cam operatively connected to said transverse bar and being adapted to engage with said stationary cam, and manually controlled means for rocking said bar, said cams preventing the rocking of said bar when said door is closed.

2. In a device of the type described, a frame, a dump carried by said frame, two floor sections disposed adjacent to one end of said dump and adapted to be raised to form stops, an extension disposed at the other end of said dump, a grain door in said frame and disposed adjacent to the end of the dump carrying the stops, and means for connecting said dump extension to or disconnecting said dump extension from said dump.

3. The combination with a frame, a dump carried by said frame, downwardly extending U-shaped bolts disposed adjacent to said dump and being carried by said frame, a channel iron rockably carried by said bolts, and a lever for rocking said channel iron, whereby said iron is adapted to be swung beneath the end of said dump to prevent the operation of the latter.

4. The combination with a frame, a dump carried by said frame, downwardly extending U-shaped bolts disposed adjacent to said dump and being carried by said frame, a channel iron rockably carried by said bolts, and a lever for rocking said channel iron, whereby said iron is adapted to be swung beneath the end of said dump to prevent the operation of the latter, said bolts being shaped so that the channel iron is rocked therein, thereby obviating any friction between the channel iron and the bolts during the operation of the device.

5. The combination with a frame, a dump carried by said frame, downwardly extending U-shaped bolts disposed adjacent to said dump and being carried by said frame, a channel iron rockably carried by said bolts, and a lever for rocking said channel iron, whereby said iron is adapted to be swung beneath the end of said dump to prevent the operation of the latter, a grain door carried by said frame and means operatively connecting said grain door to said channel iron whereby said channel iron can only be rocked when said door is open.

6. The combination with a frame, a dump carried by said frame, downwardly extending U-shaped bolts disposed adjacent to said dump and being carried by said frame, a channel iron rockably carried by said bolts, and a lever for rocking said channel iron, whereby said iron is adapted to be swung beneath the end of said dump to prevent the operation of the latter, a grain door carried by said frame, means operatively connecting said grain door to said channel iron whereby said channel iron can only be rocked when said door is open, said means comprising a cam carried by said door, a pivotal cam carried by said frame, and a link operatively connecting said cam with said channel iron, whereby said door has to be opened before said channel iron can be actuated.

ELI D. McCULLOUGH.
ARCHIE W. BUTCHER.